UNITED STATES PATENT OFFICE.

EDUARD ULLRICH, OF HÖCHST-ON-THE-MAIN, GERMANY, ASSIGNOR TO THE FARBWERKE, VORMALS MEISTER, LUCIUS & BRÜNING, OF SAME PLACE.

PROCESS OF FIXING QUINONIMID DYES.

SPECIFICATION forming part of Letters Patent No. 649,228, dated May 8, 1900.

Application filed March 29, 1899. Serial No. 710,940. (No specimens.)

*To all whom it may concern:*

Be it known that I, EDUARD ULLRICH, doctor of philosophy, a citizen of the Empire of Germany, residing at Höchst-on-the-Main, Germany, have invented certain new and useful improvements in processes of producing on fibers the chromium compounds of the quinonimid dyestuffs from their components, of which the following is a specification.

The production on the fiber of azo dyestuffs from their components was heretofore possible only with certain of these dyestuffs. This method was inapplicable for the reason that certain difficulties were encountered in the formation of the dyestuff itself. This was especially the case where in the formation of the dyestuff it was necessary to employ heat for a considerable time in the presence of volatile solvents and condensation agents. Difficulty was also experienced with by-products produced during the formation of the dye. The production on the fiber of these impure dyestuffs, if at all possible, was attended with a partial destruction of the fiber. It was for these reasons generally considered impracticable, therefore, to produce the quinonimid dyestuffs on the fiber. I have succeeded, however, in producing on the fiber by way of printing or dyeing these dyestuffs in the form of their chromium compounds. It appears that it is possible to produce these dyestuffs in the form of their chromium compounds on the fiber by steaming for a very short time (one to three minutes) and that by this process the fiber is not attacked, and although by-products are obtained, yet they do not act upon the dyestuff on account of its being rapidly fixed, do not influence its shade, and are easily removed by the ordinary washing process.

The production of the quinonimid dyestuffs on the fiber is accomplished by preparing a printing or padding color from the two substances which are to react upon each other to form the dyestuff and adding to said two substances an organic acid, chromium acetate, and the usual thickening agents. The material is then printed or padded with this color, passed once or more through the Mather Platt apparatus, then washed, soaped, and, if need be, treated with chlorine.

If gallic acid is used as one of the components, then one may proceed, instead of in the manner stated, by preparing the material with it in the usual manner and then printing or padding the material thus prepared with the printing or padding color formed from the other component. As the formation of the dyestuff takes place in an acid solution, the printing or padding color must also be acid. The presence of the acid is also necessary to bind the alkali should the material to be printed have been prepared with naphthol-sodium. All organic acids may be employed, and even mild inorganic acids, such as boric acid. Oxalic acid is preferable on account of the short time of steaming, the cheapness of this acid, and the fact that the fiber is not corroded by its use.

For the production of the quinonimid dyestuffs on the fiber the oxazines and oxazones prove most suitable. They are formed by allowing nitroso compounds of secondary or tertiary aromatic bases to act on phenols in molecular proportions. The products of reduction obtained from the nitroso bodies may also be oxidized with the other components, although, as a rule, with less useful results. The nitroso compounds may also be allowed to act on the dyewood extracts instead of upon the phenols to obtain the corresponding dyestuffs on the fiber.

Of the most important nitroso compounds may be mentioned nitrosodimethylanilin, nitrosodiethylanilin, nitrosoethylbenzylanilin, nitroso-ethyl or methyl-ortho-toluidin.

Of the phenols or oxycarboxylic acids are to be considered beta- and alpha-naphthol, 2.7 and 2.6 dioxynaphthalene, resorcinol, gallic acid.

Of the dyewood extracts instead of phenols or mixed with them may be employed, for instance, fustic extract, Persian berries extract, quercitron extract, logwood extract, prepared catechu.

Example: (*a*) Twenty grams nitrosodimethylanilin hydrochlorate are dissolved in one hundred and thirty-two grams of water and the solution thickened with five hundred grams of starch-thickening acetate, with the addition of ten grams of glycerin. (*b*) One hundred and fifty grams of Persian berries extract, 30° Baumé, are mixed with twenty grams tartaric acid and about one hundred grams water. (c) One hundred and fifty grams chromium acetate are mixed with one hundred grams water. a, b, and c are combined and well mixed. The printing color thus prepared is then printed or padded upon unprepared fabric. The printed or padded material is then dried at about 50° centigrade, steamed for about three minutes, and then washed and soaped. The shades produced on the fiber are very beautiful and uniform. They may be reserved by the underprint oxidation or reduction resists. They can be discharged white by employing oxidizing agents, which are printed immediately after drying the printed goods, and colored discharges can be obtained by adding to the discharge color direct-dyeing colors which withstand the oxidizing action or colors with albumin. The exceedingly-short time of steaming which is required to produce and fix these azo dyestuffs permits the production of special effects, which could hitherto be obtained only with great difficulty with dyestuffs not produced upon the fiber and at the expense of solidity of the fiber itself.

Having thus described my invention, I claim as new and desire to secure by Letters Patent—

The process herein described of producing on the fiber the chromium compounds of the quinonimid dyestuffs from their components, which consists in printing or padding the fiber with a color containing a nitroso compound of aromatic bases, one of the phenol-like bodies hereinbefore specified, an acid, a thickening agent and a suitable metallic salt to fix the dyestuff, then drying, steaming, washing and soaping the fiber, substantially as set forth.

In testimony that I claim the foregoing as my invention I have signed my name in presence of two subscribing witnesses.

EDUARD ULLRICH.

Witnesses:
OTTO FUNG,
J. SMITH.